(12) United States Patent
Caspi et al.

(10) Patent No.: US 7,519,202 B2
(45) Date of Patent: Apr. 14, 2009

(54) SYSTEM AND METHOD FOR SECURE BIO-PRINT AND ACCESS METHODS

(75) Inventors: Rami Caspi, Sunnyvale, CA (US); Saravanakumar V. Tiruthani, Santa Clara, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 597 days.

(21) Appl. No.: 10/641,738

(22) Filed: Aug. 15, 2003

(65) Prior Publication Data

US 2005/0036663 A1 Feb. 17, 2005

(51) Int. Cl.
*G06K 9/00* (2006.01)
(52) U.S. Cl. ..................................... 382/124
(58) Field of Classification Search ................... 382/124
See application file for complete search history.

(56) References Cited

U.S. PATENT DOCUMENTS

| | | | | |
|---|---|---|---|---|
| 6,141,436 A * | 10/2000 | Srey et al. | ................... | 382/124 |
| 6,219,793 B1 * | 4/2001 | Li et al. | ......................... | 726/19 |
| 6,256,737 B1 * | 7/2001 | Bianco et al. | ................ | 713/186 |
| 6,263,064 B1 * | 7/2001 | O'Neal et al. | .......... | 379/201.03 |
| 6,317,544 B1 * | 11/2001 | Diehl et al. | .................. | 385/115 |
| 6,484,260 B1 | 11/2002 | Scott et al. | | |
| 6,496,595 B1 | 12/2002 | Puchek et al. | | |
| 2002/0003892 A1 * | 1/2002 | Iwanaga | ..................... | 382/124 |
| 2002/0174345 A1 * | 11/2002 | Patel | .......................... | 713/186 |
| 2002/0176611 A1 * | 11/2002 | Dong | .......................... | 382/124 |

* cited by examiner

*Primary Examiner*—Tom Y Lu

(57) ABSTRACT

A telecommunications server includes a bio-print control server including one or more identification databases, a transmit/receive unit, a compare unit, and a routing control unit. Various network clients may include bio-print input units. In operation, according to certain embodiments, the user can input the bio-print using any of the selected network clients. The input is then transmitted to and received via the transmit/receive unit at the telecommunications server. The telecommunications server accesses the database(s) and compares the received bio-print input with its database to determine if there is a match. If so, then the user is given a predetermined level of access to the network client from which the bio-print has been received.

16 Claims, 7 Drawing Sheets

SYSTEM AND METHOD FOR SECURE BIO-PRINT AND ACCESS METHODS

FIELD OF THE INVENTION

The present invention relates to telecommunications systems and, in particular, to an improved system and method for secure access to communications systems.

BACKGROUND OF THE INVENTION

The proliferation of telecommunications devices and telecommunications media, e.g., landline telephones, cellular telephones, personal digital assistants (PDA), Instant Messaging (IM) Systems, Short Message Service (SMS) systems, local area networks (LAN), and the like, has meant that users often possess and make use of multiple telecommunications devices. Particularly in a business environment, this has led to increased interest in consolidation or convergence of the various communications media. That is, telecommunications systems have been developed which provide a central server for supervising telephonic and electronic messaging, i.e., voice and data.

Because many users have multiple devices for accessing various functions of the system, it is important that only authorized users be given access. This is especially true in the networked environment of modern businesses, where security is of prime importance. That is, typically, the user can make use of various telecommunications devices to contact the system. To do so, the user must typically enter a User Identification and a password or personal identification number. While this may be suited for desktop PCs (personal computer) which run soft client software (SW) packages and are equipped with full keyboard and screen, it is not convenient when the user is employing a device with a relatively small keypad, such as an IP Phone or a cellular phone.

Furthermore, using a user ID and password requires the user to memorize one or more sets of character strings. As the numbers of passwords a user is required to remember increases, the user is more likely to write them down, thereby increasing the likelihood that a breach in security and unauthorized access to the system will occur.

SUMMARY OF THE INVENTION

These and other drawbacks in the prior art are overcome in large part by a system and method according to embodiments of the present invention.

A telecommunications system according to an embodiment of the present invention includes a telecommunications server and a plurality of network clients. The telecommunications server includes a bio-print control service with one or more identification databases, a transmit/receive unit, a compare unit, and a routing control unit. Various of the network clients may include bio-print input units. In operation, according to certain embodiments, the user can input the bio-print using any of the network clients which are equipped with a bio-print input unit. The input is then transmitted to and received via the transmit/receive unit at the telecommunications server. The telecommunications server accesses the database(s) and compares the received bio-print input with its database to determine if there is a match. If so, then the user is given a predetermined level of access to the network client from which the bio-print has been received.

For example, in certain embodiments, the transmit/receive unit sends an authorization signal to the network client, and the routing control unit allows the user to complete a call. In certain embodiments, the bio-print input device may be implemented as a fingerprint identification device including, for example, a sensor to "read" or image the input fingerprint, digitizer to convert the received image to digital, and a transmitter for transmitting the image to the server.

In certain embodiments, the user may be assigned a particular extension, i.e., an office telephone. If the user then travels to another office, he can get access to another telephone by inputting his bio-print. The system may not only allow the user to call from the remote location, but may also route calls to the user's extension in the new location.

In this case, in certain embodiments, the bio-print service authenticates the user and tailors the remote system to his familiar "look and feel".

A telecommunications method according to an embodiment of the present invention includes registering a user at a server; storing one or more bio-prints associated with the user at the server; receiving a bio-print input at one of the plurality of network clients; transmitting the bio-print input to the server; determining if the bio-print input corresponds to a registered user; and permitting access to the telecommunications system from the specific network clients if the bio-print input corresponds to a registered user.

A telecommunications device according to an embodiment of the present invention includes a biometric input device and transmitter. The telecommunications device may be ergonomically designed such that the biometric input is received in the normal course of operation, e.g., without the user having to take special input steps. For example, the input device may be positioned at or on a thumb rest or similar grip-related position, where the user naturally places his thumb. The received biometric input is then transmitted to a telecommunications server, which verifies the identity of the party making the input. If the identity is verified, the user has access to the system and the received input is purged from the network device.

A better understanding of these and other specific embodiments of the invention is obtained when the following detailed description is considered in conjunction with the following drawings.

DETAILED DESCRIPTION OF EMBODIMENTS OF THE INVENTION

Figure 1:
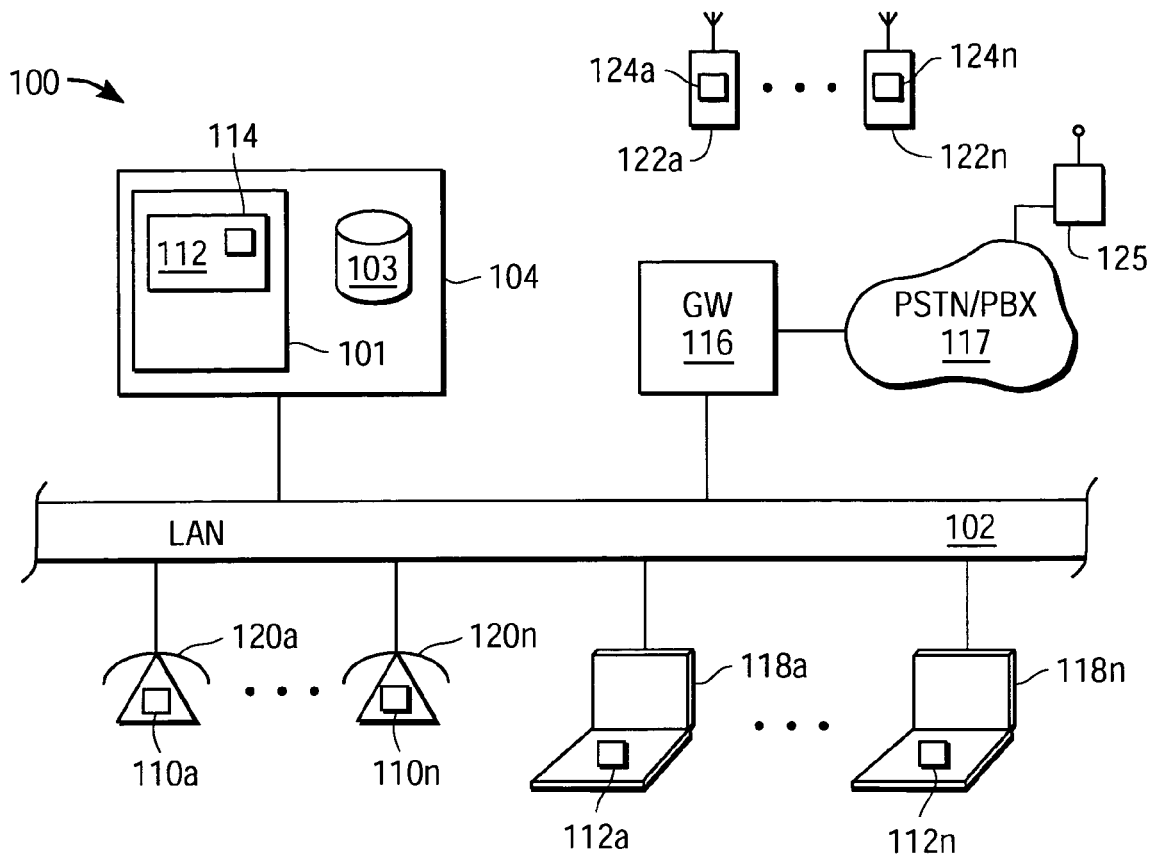
FIG. 1 is a diagram of a telecommunication system according to an embodiment of the present invention.

Turning now to the drawings and, with particular attention to FIG. 1, a diagram of an exemplary telecommunications system 100 according to an embodiment of the present invention is shown. As shown, the telecommunications system 100 includes a local area network (LAN) 102. The LAN 102 may be implemented using a TCP/IP network and may implement voice or multimedia over IP using, for example, the Session Initiation Protocol (SIP) or Recommendation H.323. Coupled to the local area network 102 is a server 104. The server 104 may include one or more controllers 101, which may be embodied as one or more microprocessors, and memory 103 for storing application programs and data. As will be explained in greater detail below, the server 104 may provide a variety of services to various associated client devices, including telephones, personal digital assistants, Instant Messaging units, and the like. Further, according to embodiments of the present invention, a bio-print or biometric service unit 114 may be provided, which may be part of an interactive suite of applications 112, run by controller 101, as will be described in greater detail below.

Also coupled to the LAN 102 is a gateway 116 which may be implemented as a gateway to a private branch exchange (PBX), the public switched telephone network (PSTN) 117, or any of a variety of other networks, such as a wireless or cellular network. In addition, one or more LAN or IP telephones 120a-120n and one or more computers 118a-118n may be operably coupled to the LAN 102. A plurality of cellular telephone units 122a-122n may also couple to the network, via gateway 116.

The computers 118a-118n may be personal computers implementing the Windows XP operating system and thus, running Windows Messenger client. In addition, the computers 118a-118n may include telephony and other multimedia messaging capabilities using, for example, peripheral cameras, microphones and speakers (not shown) or peripheral telephony handsets. In other embodiments, one or more of the computers may be implemented as wireless telephones, digital telephones, or personal digital assistants (PDAs). Thus, the figures are exemplary only. The computers may include one or more controllers, such as Pentium-type microprocessors, and storage for applications and other programs.

One or more of the telephones may include bio-print input systems 116a-116n; similar bio-print input systems 112a-112n may be provided on the personal computers 118a-118n. Finally, the cellular telephones 122a-122n may also be provided with bio-print input systems 124a-124n.

As will be described in greater detail below, the bio-print input systems allow The user to securely access the telephone network. The bio-print inputs are transmitted to and received by the bio-print service unit 114, which confirms the caller's identity. In embodiments in which cellular telephones are equipped with bio-print input devices, their bio-print inputs may be received at a cellular switching control unit 125 and provided to the base bio-print service 114.

Figure 2:
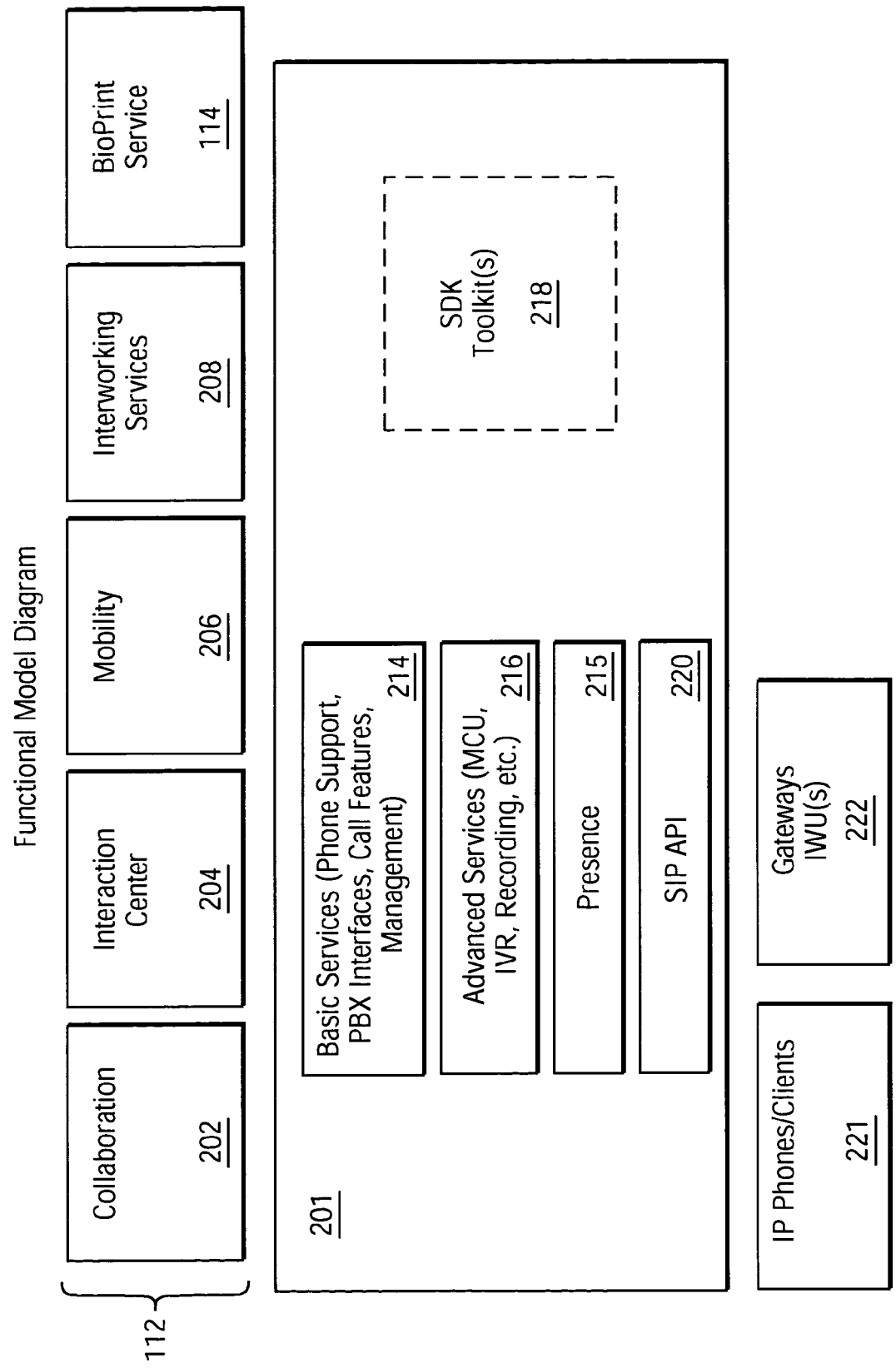
FIG. 2 is a diagram illustrating a telecommunications server including a bio-print service module according to an embodiment of the present invention.

Turning now to FIG. 2, a functional model diagram illustrating a server 104 including a biometric service unit 114 is shown. More particularly, FIG. 2 is a logical diagram illustrating a particular embodiment of a server 104. The server 104 includes a plurality of application modules 112 and a communication broker module 201. In addition, the server 104 provides interfaces, such as SIP APIs (application programming interfaces) 220 to SIP IP phones 221 and gateways/interworking units 222.

According to the embodiment illustrated, the broker module 201 includes a basic services module 214, an advanced services module 216, an automation module 212, and a toolkit module 218.

The basic services module 214 functions to implement, for example, phone support, PBX interfaces, call features and management, as well as Windows Messaging and RTC add-ins, when necessary. The phone support features allow maintenance of and access to buddy lists and provide presence status.

It is noted that the above are MS Windows related terminology, but this invention can work in any type of IP based network, such as IBM SameTime, SUN One and the like.

The advanced services module 216 implements function such as, multipoint control unit (MCU), recording, Interactive Voice Response (IVR), and the like. MCU functions are used for voice conferencing and support ad hoc and dynamic conference creation from a buddy list following the SIP conferencing model for ad hoc conferences. In certain embodiments, support for G.711 and G.723.1 codecs is provided. Further, in certain embodiments, the MCU can distribute media processing over multiple MC's (Multimedia Processors) servers using the MEGACO protocol.

Presence features 215 provide device context for both SIP registered devices and user-defined non-SIP devices. Various user contexts, such as In Meeting, On Vacation, In the Office, etc., can be provided for. In addition, voice, e-mail and instant messaging availability may be provided across the user's devices. The presence feature 215 enables real time call control using presence information, e.g., to choose a destination based on the presence of a user's devices. In addition, various components have a central repository for presence information and for changing and querying presence information. In addition, the presence module 215 provides a user interface for presenting the user with presence information.

The broker module 201 may include an IVR such as the ComResponse platform, available from Siemens Information and Communication Networks, Inc.. ComResponse features include speech recognition, speech-to-text, and text-to-speech, and allow for creation of scripts for applications. The speech recognition and speech-to-text features may be used by the collaboration summarization unit 114, as will be discussed in greater detail below.

In addition, real time call control is provided by a SIP API 220 associated with the basic services module 214. That is, calls can be intercepted in progress and real time actions performed on them, including directing those calls to alternate destinations based on rules and or other stimuli. The SIP API 220 also provides call progress monitoring capabilities and for reporting status of such calls to interested applications. The SIP API 220 also provides for call control from the user interface.

According to the embodiment illustrated, the application modules 112 include a collaboration module 202, an interaction center module 204, a mobility module 206, an interworking services module 208, and a bioprint service module 114.

The collaboration module 202 allows for creation, modification or deletion of a collaboration session for a group of users. The collaboration module 202 may further allow for invoking a voice conference from any client. In addition, the collaboration module 202 can launch a multi-media conferencing package, such as the WebEx package. It is noted that the multi-media conferencing can be handled by other products.

The interaction center 204 provides a telephony interface for both subscribers and guests. Subscriber access functions include calendar access and voicemail and e-mail access. The calendar access allows the subscriber to accept, decline, or modify appointments, as well as block out particular times. The voicemail and e-mail access allows the subscriber to access and sort messages.

Similarly, the guest access feature allows the guest access to voicemail for leaving messages and calendar functions for scheduling, canceling, and modifying appointments with subscribers. Further, the guest access feature allows a guest user to access specific data meant for them, e.g., receiving e-mail and fax back, etc.

The mobility module 206 provides for message forwarding and "one number" access across media, and message "morphing" across media for the subscriber. Further, various applications can send notification messages to a variety of destinations, such as e-mails, instant messages, pagers, and the like. In addition, the subscriber can set rules that the mobility module 206 uses to define media handling, such as e-mail, voice and instant messaging handling. Such rules specify data and associated actions. For example, a rule could be defined to say "If I'm traveling, and I get a voicemail or e-mail marked Urgent, then page me."

In certain embodiments, each of these features is accessible from a network client only if identity is verified by the bio-print service module 114. As will be explained in greater detail below, in a registration mode, the bio-print service module 114 is designed to receive registrations of users, i.e., a biometric input, and store them in a database associated with one or more telecommunications devices or numbers. In a verification mode, the bioprint service module 114 receives bio-print inputs and compares them against corresponding registered bio-prints in the database. If there is a match, then the call or other access to the system can be completed.

Figure 3:
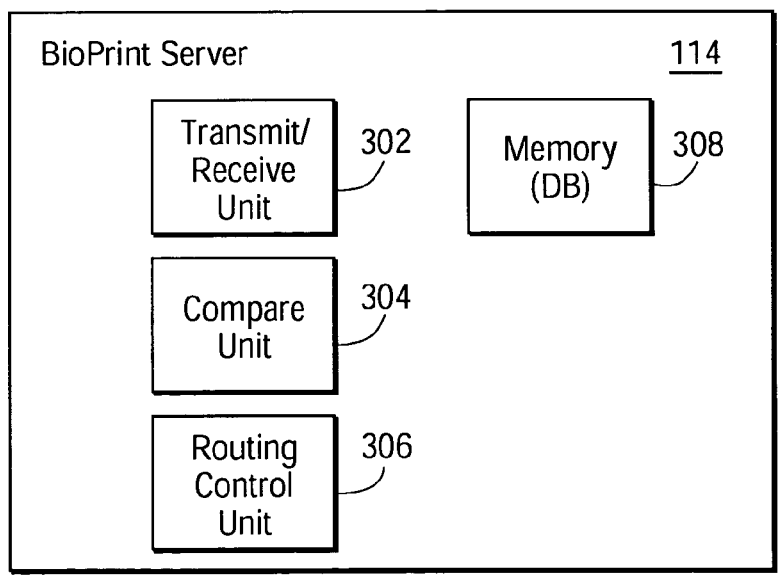
FIG. 3 is a diagram illustrating a bio-print service module according to an embodiment of the present invention.

Turning now to FIG. 3, a block diagram illustrating bio-print service 114 is shown. As shown, the bio-print service 114 includes a transmit/receive unit 302, a compare unit 304, a routing control unit 306, and a database unit 308 for interacting with memory 103 (FIG. 1).

In the registration mode, the bio-print service 114 receives a user ID and password, and a bio-print input (typically, from an operably coupled input device, such as a standalone input device or one associated with a coupled network client), and stores them in association in the database 308.

In the verification mode, the transmit/receive unit 302 is designed to receive bio-print inputs transmitted from various network clients, and provide them to the compare unit 304. In response, the compare unit 304 accesses the database 308 to determine if there is a corresponding registration. The compare unit 304 then provides an indication to the routing control unit 306. The routing control unit 306 will then provide a signal to the requesting network client whether that client is allowed access to the system, and the corresponding privileges.

The biometric input may take a variety of forms. For example, in certain embodiments, the biometric input may be from a fingerprint or thumbprint reader, though other known feature imaging may be used. Similarly, known voice recognition techniques may be employed.

Figure 4A:
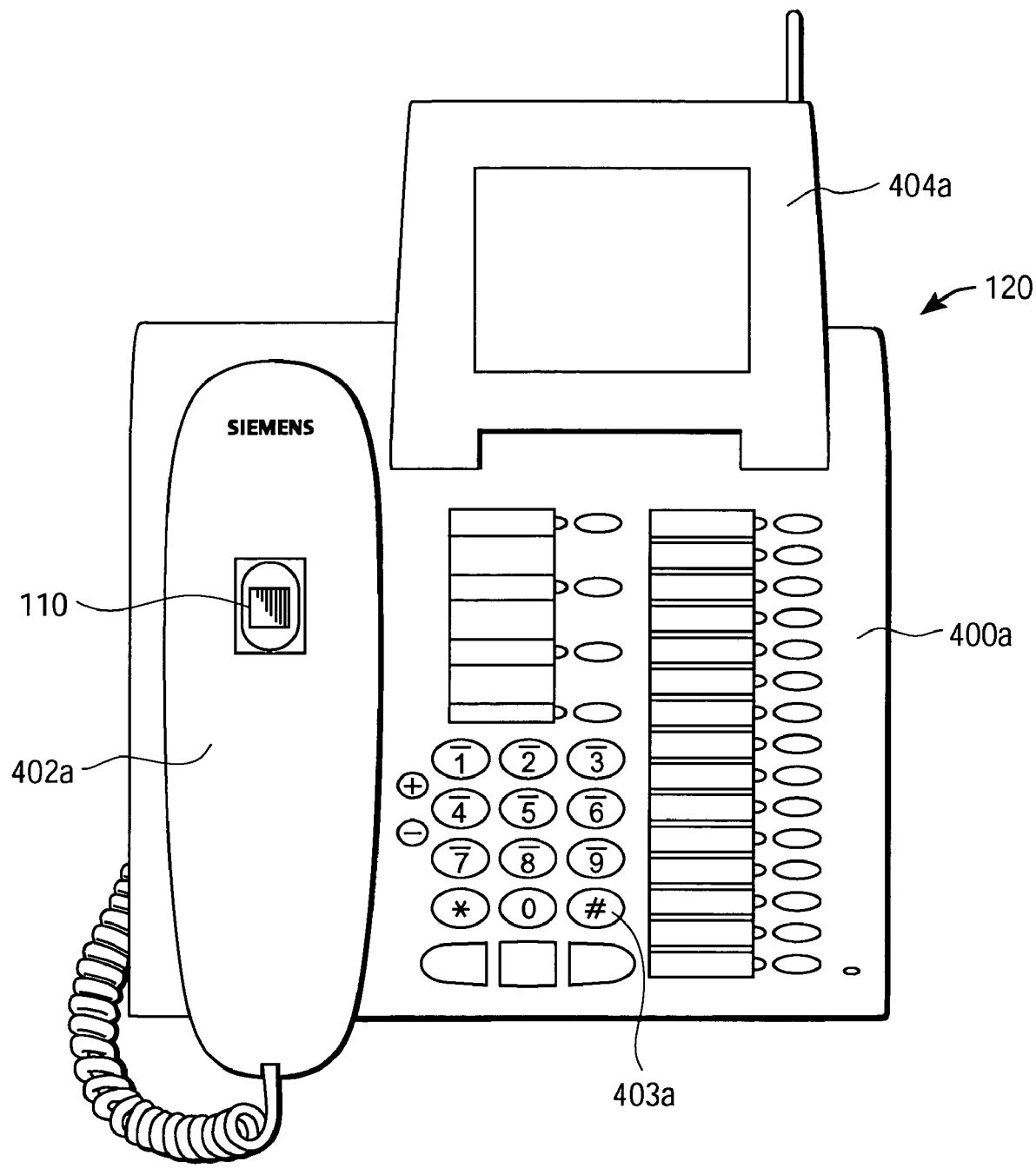
FIG. 4A and FIG. 4B illustrate exemplary telecommunications devices including bio-print input modules according to an embodiment of the present invention.
Figure 4B:
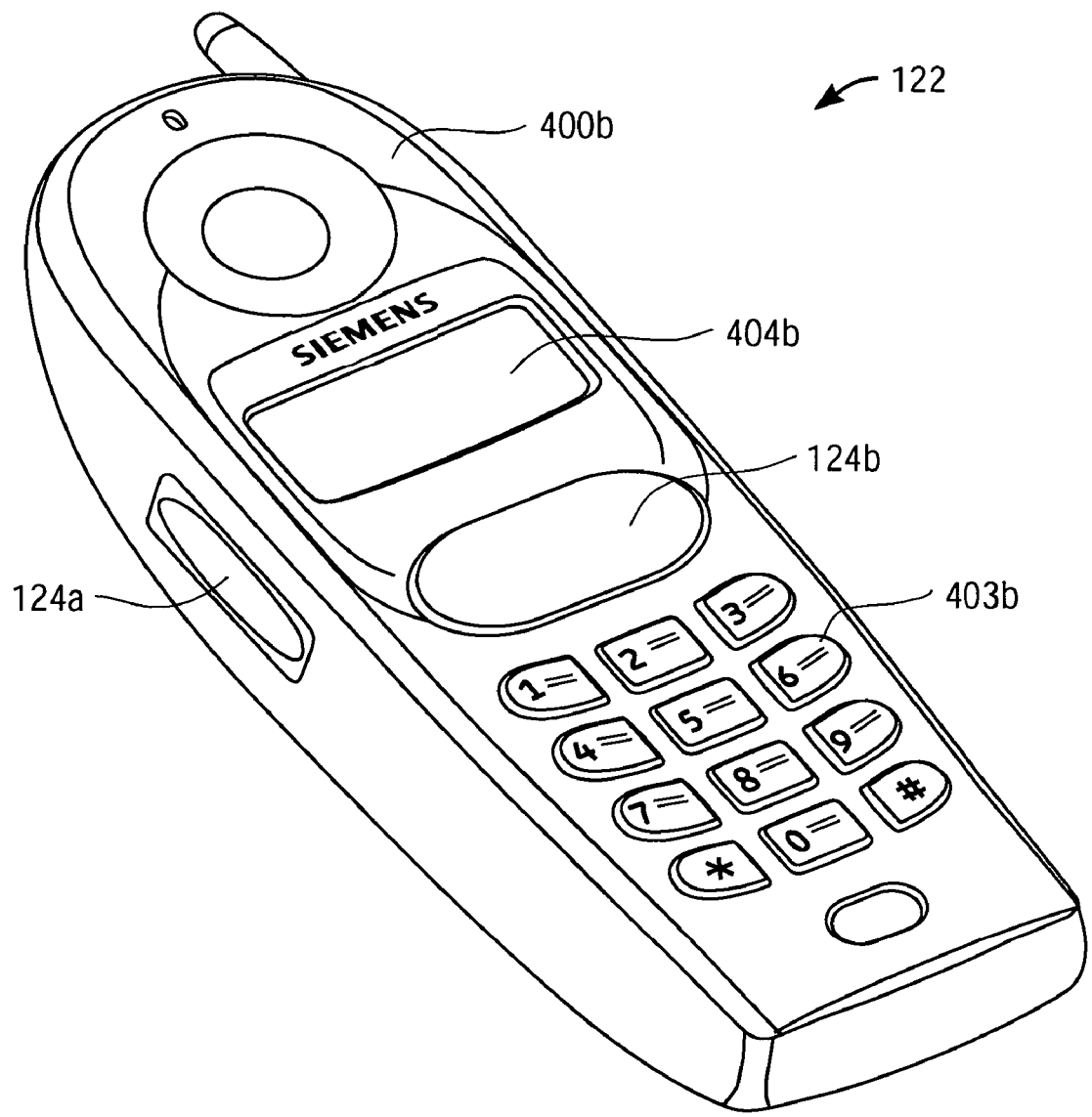

Turning now to FIG. 4A and FIG. 4B, exemplary network clients including bio-print input devices are shown. Shown in FIG. 4A is an exemplary desktop telephone 120. As shown, the telephone 120 includes a base 400a, a handset 402a, keypad 403a, and display 404a. In the embodiment illustrated, the handset 402a includes a bioprint input device 110a. The bioprint input device 110a may be a fingerprint or thumb-print reader and thus may be adapted to receive a user's input thumb or fingerprint. More particularly, the bioprint input device 110a may be positioned ergonomically on the handset 402a such that the user's normal grip allows an "automatic" input. The bio-print input device 110a may be embodied as CMOS optical sensor imaging device or a CCD imaging device, for example, which are used to receive and digitize the bio-print input. It is noted that, while discussed in the context of fingerprints, the bio-prints may be based on facial recognition, voice, or other bio-input. Thus, the figures are exemplary only. Further, while shown on the handset, the input may also be positioned in a variety of convenient locations, such as on an "answer" button for automatic recognition when answering a call using the speakerphone mode of operation.

FIG. 4B illustrates an exemplary wireless or cellular device 122 including a bio-print input device according to embodiments of the present invention. As shown, the device includes a housing 400b, keypad 403b, screen 404b, and bio-print input 124a, 124b. Typically, only one such input will be provided, though more than one may be. Thus, the figure is exemplary only. As noted above, the device 122 may be embodied as a wireless or cellular phone, or other wireless device, such as a PDA. Again, the bio-print input device 124 may be positioned on the side of the cellular handset for convenient natural verification when handling the device, or on a face, such as for a call or answer button.

Figures 5, 6:
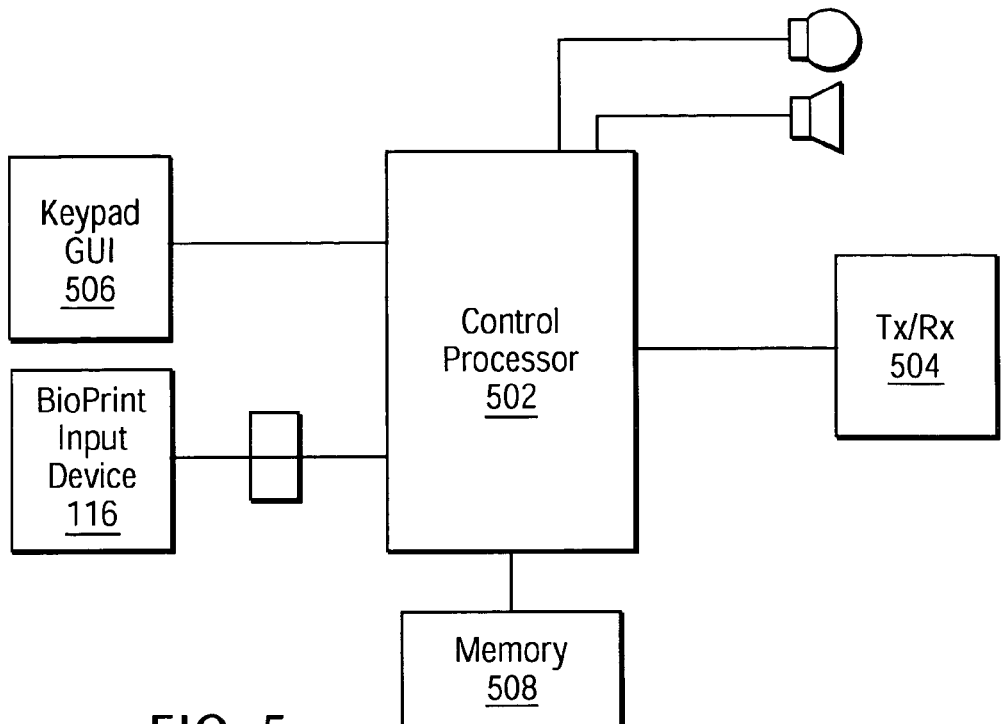
FIG. 5 is a block diagram illustrating a telecommunications device with a bio-print module according to an embodiment of the present invention.
FIG. 6 is an exemplary database entry according to an embodiment of the present invention.

Turning now to FIG. 5, a block diagram of an exemplary network client is shown. In the embodiment illustrated, the network client includes a control processor 502, a transceiver unit 504, a keypad/GUI 506, and memory 508. In operation, the bio-print input device 116 receives a bio-print input from the user; the control processor 502 receives the input and forms it into a transmission format. The transceiver 504 then sends the image out to the service 114. The transceiver 504 will then receive one or more control signals from the service 114 indicating whether there has been a match to allow the user access to the network. The control processor 502 then responds accordingly. In certain embodiments, the control processor 502 may provide visual or audio indicia that access has been granted or denied. Thus, even if the client is tempered with, security will not be breached, since positive bio-print identification is achieved in the service 114. The bio-print input is then released or flushed from memory 508. Thus, the bio-print input is never stored locally, thereby enhancing security.

FIG. 6 illustrates exemplary database entries according to an embodiment of the present invention. The entries 601a, 601b may include bio-print 602, user ID 604, password 606, telephone number 608, or locations 610. The bio-print 602 is the stored bio-print entered during a registration phase. Typically, the user or a system administrator has associated a user ID and password, which are used to access the registration system. Once accessed, the user can input the bio-print 602. Bio-print, user ID and/or password may be cross-referenced to one or more telephone numbers or one or more user locations. More particularly, the user may register one or more telephone numbers. Each telephone associated with each number includes a bio-print input device. When the user provides the input, the system verifies the user's identity and the number from which he is calling and then lets him have access from the particular number.

Figure 7:
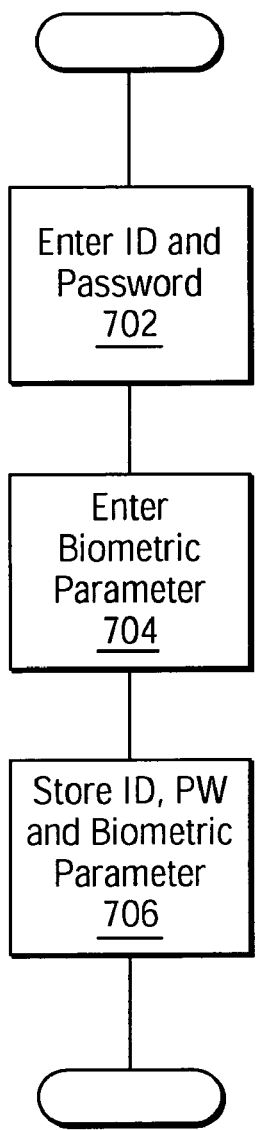
FIG. 7 is a flowchart illustrating operation of an embodiment of the present invention.

FIG. 7 is a flowchart illustrating operation of an embodiment of the present invention and, in particular, a registration mode. At 702, a user enters his ID and password into an input device. The device may be a telecommunications client, such as a telephone or computer. These are received by the bio-print service 114. These should be associated in database with one or more telephones, telephone numbers, locations, or other device identification, such as Instant Messaging ID, etc.

At 704, the user enters his biometric parameter(s) at a bioprint input device. This may be a server-specific device, though may also be one associated with a registered device. As noted above, these can include voiceprint or fingerprint inputs, among others. At 706, the system stores the parameters in the database in association with the password, ID, and telephones, numbers, or locations for future use. The centrally-stored bioprint can then be used to access a plurality of devices. In practice, the bio-print device for the initialization may be located in a secure location at the corporation, to ensure it cannot be hacked. Administratively, the bio-print and password may be received from the employee when he picks up his badge.

Figure 8:
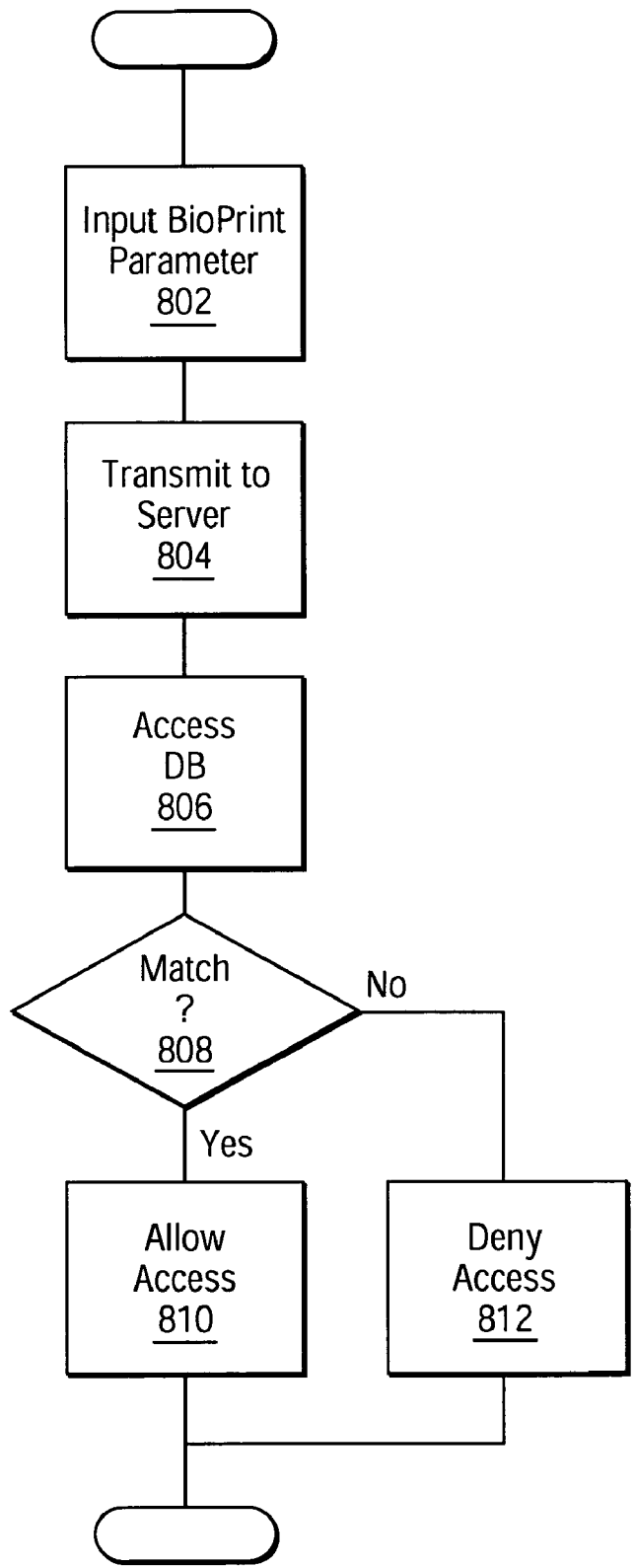
FIG. 8 is a flowchart illustrating operation of an embodiment of the present invention.

FIG. 8 is a flowchart illustrating operation of another embodiment of the present invention. In particular, shown in FIG. 8 is using the bioprint input to access the network for either making or receiving a call or other communication. For example, the user may be providing the input from a known telephone extension or cell phone. At 802, the user inputs the bioprint parameter into the selected network client bioprint input device 116. The input may be stored in memory 508. The control processor 502 (FIG. 5) then digitizes and otherwise formats the input for transmission. At 804, the network client's transmit/receive unit 504 transmits the input to the bioprint service 114, where it is received at the transmit/receive unit 302 (FIG. 3). At 806, the compare unit 304 accesses the database 308 for the bioprint entry. If there is a match, as determined at step 808, then the user is allowed access by the routing control unit 306, at step 810. For example, the bioprint service 114 can send an accept signal to the telecommunications device. Otherwise, access is denied, at step 812.

Figure 9:
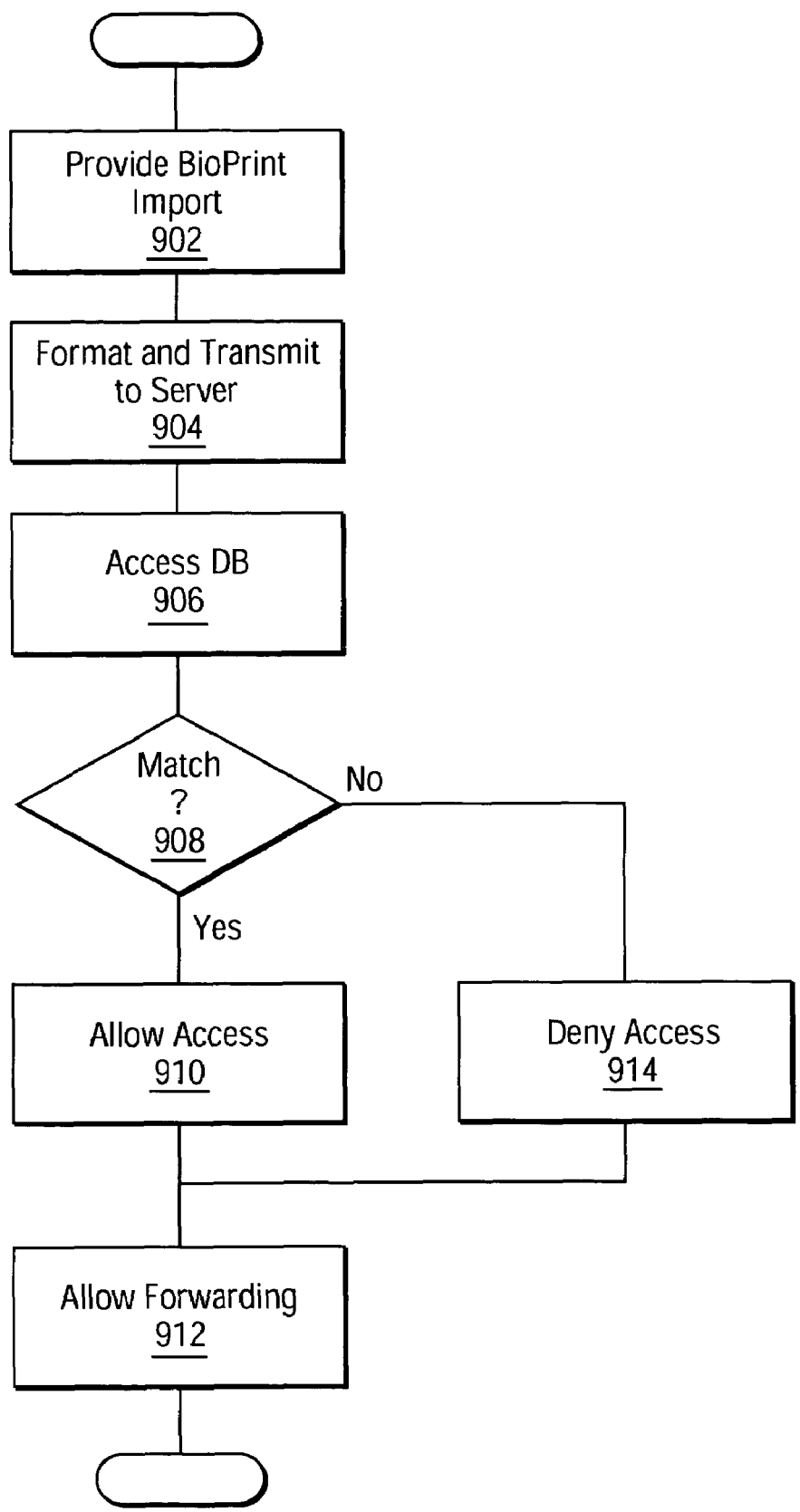
FIG. 9 is a flowchart illustrating operation of an embodiment of the present invention.

FIG. 9 is a flowchart illustrating another embodiment of the present invention. In this embodiment, for example, the user may be at a remote telephone, i.e., not his usual "home" telephone, but one still registered to the network, such as a conference room telephone. At 902, the user provides his biometric input to the telecommunications device and the bioprint is stored in memory 508. At 904, the input formatted for transmission and is transmitted to the server. At step 906, the compare unit 304 accesses the database 308. At step 908, the compare unit 304 determines if there is a match. At step 910, access is allowed if there is a match, and the routing control unit 306 causes calls for the user's "base" number(s) to be forwarded to the input-from number or location, at step 912. In addition, other preferences may also be forwarded to the remote telephone. If there was no match, then at 914, access is denied.

The invention described in the above detailed description is not intended to be limited to the specific form set forth herein, but is intended to cover such alternatives, modifications and equivalents as can reasonably be included within the spirit and scope of the appended claims.

What is claimed is:

1. A method for use in a telecommunications system having a server and a plurality of network clients, comprising:
   registering a user at said server and associating the user with a plurality of network clients;
   storing a bio-print image associated with said user at said server;
   receiving a bio-print image input at one of said plurality of network clients;
   transmitting said bio-print image input to said server;
   determining if said bio-print image input corresponds to a registered user; and
   permitting access to said telecommunications system from said one of said plurality of network clients if said bioprint image input corresponds to a registered user;
   wherein said one of said plurality of network clients comprises one of a plurality of network clients associated with the user and said bio-print image.

2. A telecommunications method in accordance with claim 1, wherein said permitting access comprises forwarding one or more calls for said user at a home location to a location of said input.

3. A telecommunications method in accordance with claim 1, wherein said permitting access comprises allowing a telephone call to be made from a location of said input.

4. A telecommunications method in accordance with claim 1, wherein said registering comprises registering said user from a remote location.

5. A telecommunications method in accordance with claim 1, wherein said permitting access comprises transmitting one or more control signals to said remote network client when said bio-print image input corresponds to a registered user.

6. A telecommunications system, comprising:
   a plurality of network clients including bio-print image input devices;
   a server adapted to store a bio-print image associated with a user and said plurality of network clients; and
   wherein a user can obtain access to said network via any of said plurality of network clients by applying a bio-print image input to one of said plurality of network clients and transmitting said bio-print image input to said server for verification;
   wherein the network client comprises one of the plurality of network clients associated with the user and said bio-print image.

7. A telecommunications system in accordance with claim 6, wherein said server is adapted to verify said bio-print image input and allow a user to access said network if said bio-print image is verified.

8. A telecommunications system in accordance with claim 7, wherein access comprises forwarding one or more calls for said user at a default location to a location of said input.

9. A telecommunications system in accordance with claim 7, wherein said access comprises allowing a telephone call to be made from a location of said input.

10. A telecommunications system in accordance with claim 6, wherein said server is adapted to receive a bio-print image registration from a user at a remote location.

11. A telecommunications system in accordance with claim 6, wherein said bio-print image input is erased from memory at said network client when verification is received.

12. A telecommunications device for use in a telecommunications network, comprising a memory and a bio-print image input device, wherein said telecommunications device obtains access to predetermined features of said network responsive to verification of said bio-print image input, wherein said verification includes identifying a plurality of network devices associated with a particular bio-print image input, wherein said predetermined features comprise forwarding one or more calls for a user associated with said plurality of network devices at a home location to a location of said input.

13. A telecommunications device in accordance with claim 12, wherein said verification comprises storing said bio-print image input in said memory, transmitting said bio-print image input to a bio-print service module and receiving one or more verification signals from said bio-print service module.

14. A telecommunications device in accordance with claim 13, wherein said bio-print image input is cleared from memory when verification is received.

15. A telecommunications device in accordance with claim 12, wherein said bio-print image input comprises a fingerprint input.

16. A telecommunications method, comprising:
   associating a user's bio-print image with a plurality of user devices;
   receiving said user's bio-print image upon use of any one of said plurality of user devices; and
   allowing access to predetermined features of an associated network upon verification of a user's identity, the verification and access being responsive to said receiving said user's bio-print image, wherein the predetermined features include forwarding one or more calls for the user at a home location to a location of said input.

* * * * *